Aug. 7, 1945.   C. D. BUCK   2,381,805
VARIABLE SPEED TRANSMISSION MECHANISM
Filed June 22, 1942   4 Sheets-Sheet 1
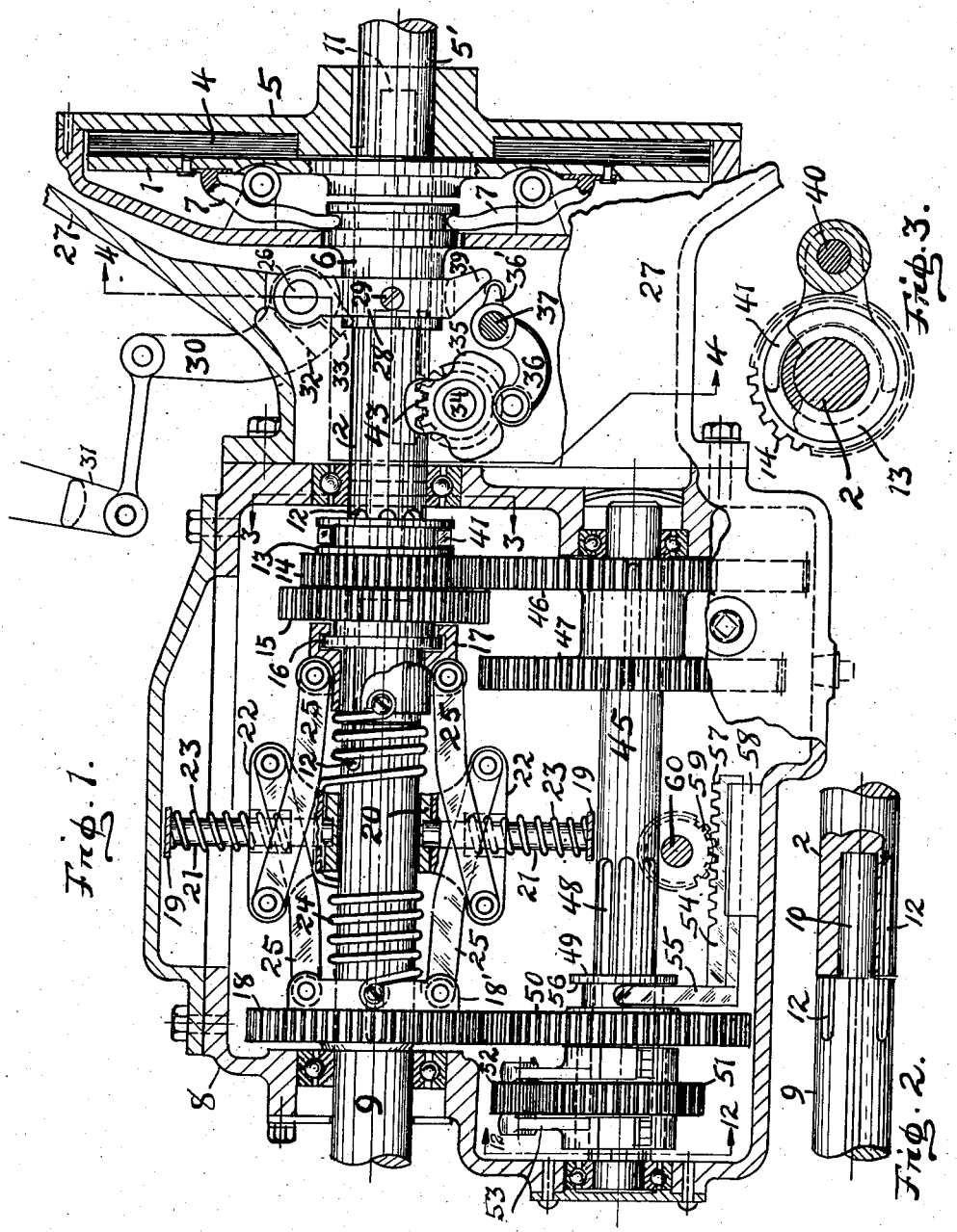
Clyde D. Buck INVENTOR.
BY
H. G. Burns Atty.

Aug. 7, 1945.  C. D. BUCK  2,381,805
VARIABLE SPEED TRANSMISSION MECHANISM
Filed June 22, 1942   4 Sheets-Sheet 2
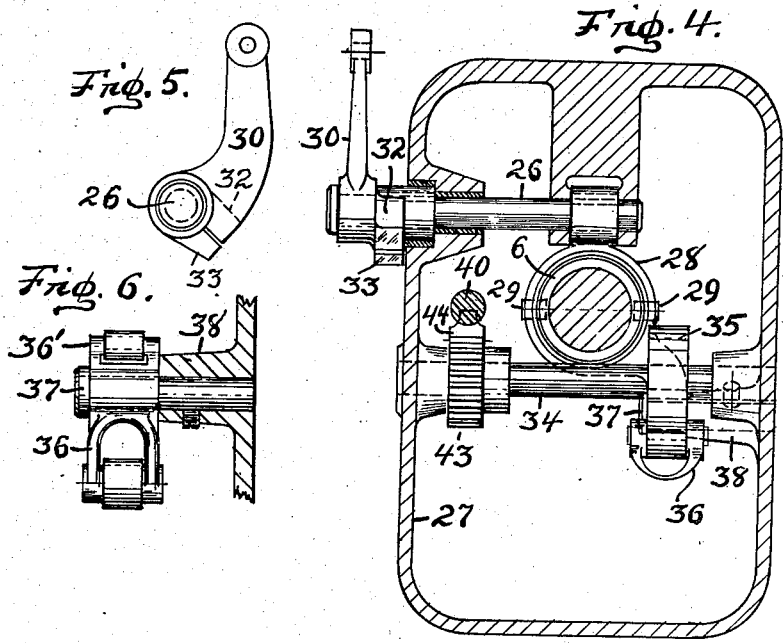
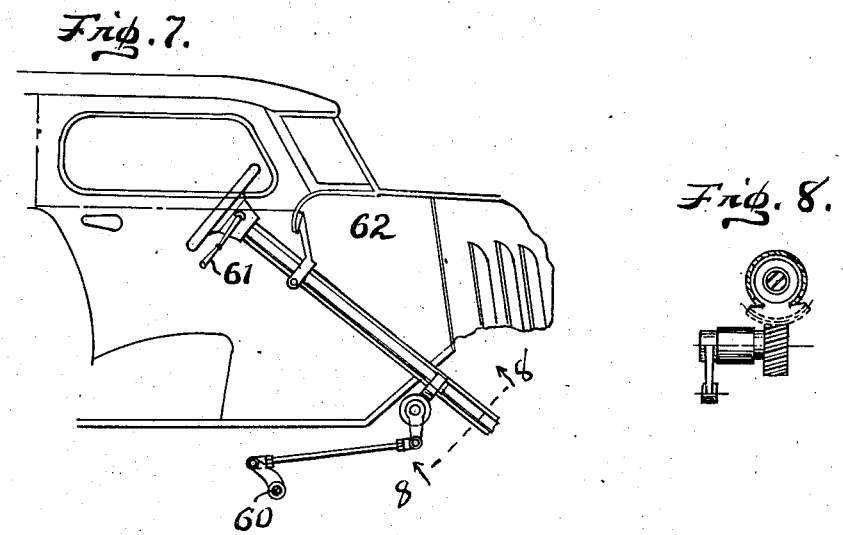
Clyde D. Buck INVENTOR.
BY
H. G. Burns Atty.

Aug. 7, 1945. C. D. BUCK 2,381,805
VARIABLE SPEED TRANSMISSION MECHANISM
Filed June 22, 1942 4 Sheets-Sheet 3

Clyde D. Buck INVENTOR.
BY
H. G. Burns Atty

Patented Aug. 7, 1945

2,381,805

UNITED STATES PATENT OFFICE 2,381,805

VARIABLE SPEED TRANSMISSION MECHANISM

Clyde D. Buck, Fremont, Ind.

Application June 22, 1942, Serial No. 447,909

4 Claims. (Cl. 192—3.5)

This invention relates to mechanism for automatically shifting gears, adapted for example to the variable speed transmission mechanism for automobiles and other apparatus.

An object of the invention is to provide in a power transmission mechanism having gears arranged so that by shifting of certain of the gears into different engaging positions with other gears, the speed ratio between a drive shaft and a propeller shaft is selectively varied, an automatic means for shifting the gears from one engaging position to another according to the speed of the propeller shaft, particularly from low speed to intermediate speed and from intermediate speed to high speed in successive order, and vice versa.

Another object of the invention is to provide in a power transmission mechanism having speed change gears, a propeller shaft, and alined drive shaft actuated by a motor driven clutch, a mechanism for automatically shifting the gears from one positon to another according to the speed of the propeller shaft, and another mechanism operatively associated with the shifting gears by which to move the clutch out of action during movement of the shift gears from one engaging positon to another.

And a further object of the invention is to provide in a power transmitting mechanism having speed change gearing associated with a propeller shaft and a clutch operated drive shaft, a manually operated means for throwing the clutch out of action, and another mechanism operatively associated with said gearing for automatically moving the clutch out of action during movement of the shift gears from one engaging position to another independently of said manually operated clutch controlling means.

Other objects and advantages of the invention appear in the following description.

An illustrative embodiment of the invention is shown in the accompanying drawings, in which:

Fig. 1 is a side elevational view of a speed change transmission mechanism in which the invention is incorporated, the view being shown in section;

Fig. 2 is a detail view showing the abutting end portions of a propeller and drive shafts used in the transmission mechanism, the drive shaft being partially in section;

Fig. 3 is a detail view showing part of the gear shifting mechanism, partially cut away and in section on the line 3—3 of Fig. 1;

Fig. 4 is a view showing a vertical transverse section of Fig. 1 on the line 4—4 thereof;

Fig. 5 is a detail view of a part projected from Fig. 4 in a plane at right angles thereto;

Fig. 6 is a detail top plan view of part of the structure shown in Fig. 4;

Fig. 7 is a fragmentary side elevational view of a car body equipped with manually operated means for control of certain gears in the transmission mechanism;

Fig. 8 is a detail view of mechanism shown in Fig. 7, in section on the line 8—8 thereof, and drawn to an increased scale;

Figure 9:
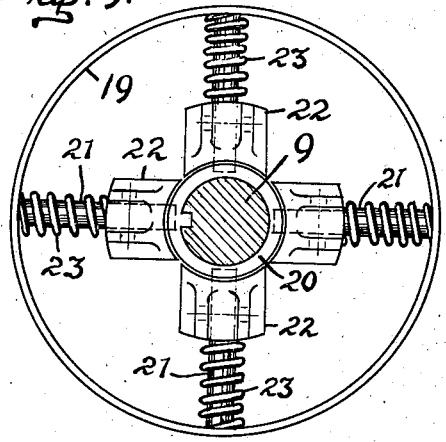
Fig. 9 is an end elevational view of the governor mechanism for controlling the shift gears, the propeller shaft being shown in section.
Figure 10:
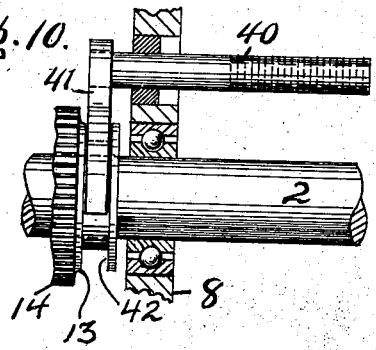
Fig. 10 is a detail top plan view of the gear shifting mechanism.
Figure 11:
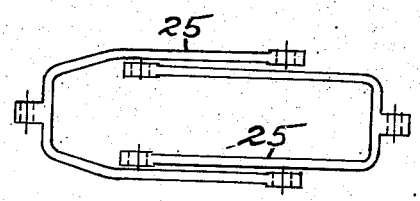
Fig. 11 is a detail plan view of a pair of the governor arms.
Figure 12:
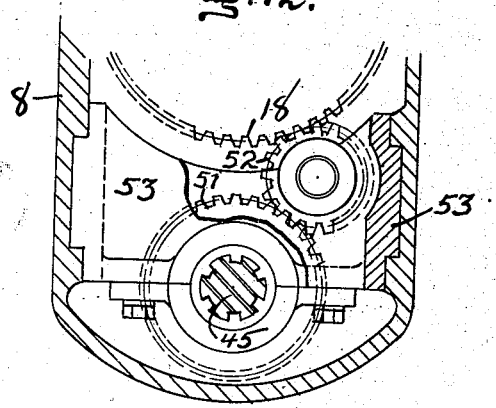
Fig. 12 is a detail transverse cross sectional view of reverse gearing, the section being on the line 12—12 of Fig. 1.
Figure 13:
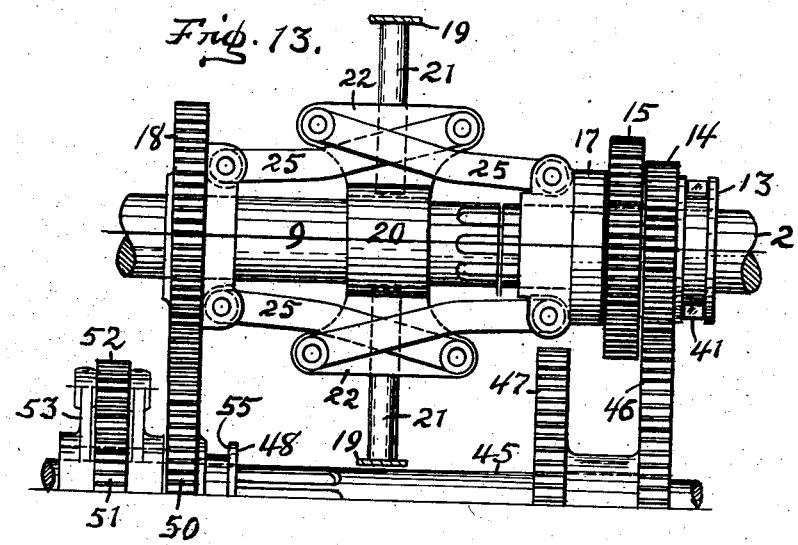
Fig. 13 is a fragmentary side elevational view of the governor and shift gearing disposed in first speed or low gear position.
Figure 14:
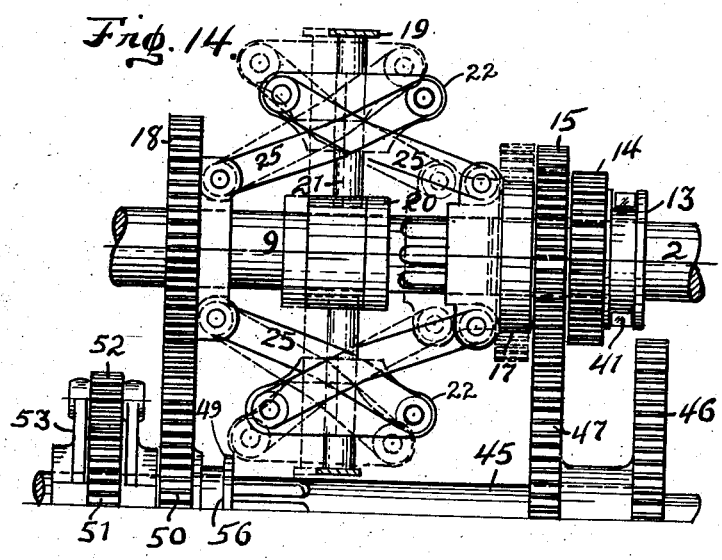
Fig. 14 is another similar fragmentary view showing the gearing in second speed or intermediate gear position.

The invention as illustrated consists of a speed change power transmitting mechanism actuated by a motor driven clutch through the medium of which rotary movement is imparted in various ratios to a propeller shaft.

The clutch preferably is of the usual type having a drag plate 1 splined on a transmission shaft 2, axially alined with a drive shaft 3 of a motor (not shown), and friction discs 4 disposed between the drag plate and the fly wheel 5 for the motor. In this instance there is provided a sleeve 6, loosely mounted on the transmission shaft 2, and levers 7 pivoted in the fly wheel structure, having engagement with said sleeve and drag-plate, through the medium of which the clutch is thrown into and out of action upon axial movement of the sleeve.

The speed change mechanism has a gear case 8 in which are mounted, in axial alinement, said transmission shaft 2 and a propeller shaft 9, there being a stud 10 on one of said shafts that extends loosely into the other shaft by which alinement of said shafts is maintained. The transmission shaft 2 has a similar stud 11 that extends loosely into the motor drive shaft 5' for the same purpose. By this arrangement the motor shaft, transmission shaft and the propeller shaft are rotatable independently of each other upon a common axis.

The abutting end portions of the transmission shaft 2 and propeller shaft 9 have similarly spaced splines 12 made therein, and upon said end portions is mounted a shift-sleeve 13 having engaging relation with the splines therein, and which is provided with step gears 14 and 15. The shift-sleeve is axially movable from one extreme position exclusively on the transmission shaft to its opposite extreme position in which the sleeve encompasses the abutting end portions of both the transmission shaft and the propeller shaft where the sleeve has splined engagement with both of said shafts, thus to establish direct driving relation therebetween.

The rear end of the shift-sleeve 13 has thereon an annular flange 16 that is engaged by a loose concentric collar 17, and the propeller shaft 9 has keyed thereon a gear 18 located at a point spaced from the abutting ends of the shafts 2 and 9. Upon the propeller shaft is disposed a spider consisting of a rim 19, hub 20, and radial spokes 21, the hub being splined on the shaft 9 so as to have relative axial movement thereon. Upon each spoke is loosely disposed a governor weight 22 and a corresponding compression spring 23, said spring being located between the rim and the weight and has the tendency to restrain radial outward movement thereof. Mounted concentrically with the axis of the shafts 2 and 9 is a contraction spring 24 the ends of which are secured respectively to the hub 18' of the gear 18 and the collar 17, which has the tendency to urge the collar and the shift gears rearwardly toward the gear 18. Each weight 22 has pivoted thereon a pair of governor arms 25 that have also pivotal connection with the hub of the gear 18 and the collar 17 respectively. Preferably, one of each pair of arms extend astride the corresponding weight and the other pair of arms, thus to afford extended radii of action thereof. When the spider is revolved, upon rotation of the propeller shaft 9, the governor weights 22 tend to slide radially outward upon the spokes in opposition to resistance of the spring 23 because of centrifugal force, aided by a contractive force of the spring 24. As the weights move outwardly, the spider and the collar 17 with its associated step gears move axially toward the gear 18, said movement being occasioned through the medium of the governor arms. In this manner the shift gears are adjustably moved axially to an extent correspondingly as the speed of the propeller shaft varies. Rearward movement of the shift gear member is aided by the contractive urge of the spring 24 in opposition to resistance of the springs 23. The urge of the spring 24 and restraint of the springs 23 are such that when the propeller shaft is motionless the weights are balanced in their innermost positions and the shift gear member is then disposed in its forwardmost position.

A rock-shaft 26 is mounted in the fly wheel housing 27 and has secured thereon a lever member 28 that is connected by means of pivots 29 with the clutch sleeve 6, so that axial movement of the sleeve is occasioned upon rocking of the shaft 26. The outer end of the rock shaft 26 has loosely mounted thereon an actuating lever 30 that has linked connection with a pedal 31, and is provided with a lateral jaw 32 that overlaps another jaw 33 which is secured on the outer end of the rock shaft. Upon manual operation of the pedal 31 in one direction the rock shaft accordingly is turned through the medium of said jaws causing movement of the clutch sleeve 6 forwardly through the medium of the lever member 28, thus throwing the clutch out of action.

In the housing 27 is mounted an oscillating shaft 34 having thereon a member provided with an annular series of cams 35 which has operative engagement with a rock lever 36 that is pivotally mounted upon a stud 37 projecting from a boss 38 in the housing. An arm 36' on the rock lever extends into the path of the pendant lug 39 on the lever member 28 so that when the rock-lever 36 is depressed by action of any one of the cams 35 the clutch sleeve 6 is moved forward through the medium of the lever member 28, independently with respect to action of the pedal 31.

A longitudinally movable shaft 40 is suitably mounted in the forward part of the gear case and has mounted on its inner end a fork 41 the arms of which extend astride the shift sleeve 13 in an annular groove 42 made therein, so that upon axial movement of the shift gears corresponding movement thereby is imparted to the sliding shaft 40. The oscillating shaft 34 has secured thereon a pinion 43 that has toothed engagement with a rack 44 secured on the slide shaft 40, so that axial movement of the shift gear member is accompanied by rotary movement of the oscillating shaft and the series of cams thereon, thus causing the clutch to be thrown out of or let into action through the medium of the rock lever 36.

In the gear case 8 is mounted a countershaft 45 having fixed thereon step gears 46 and 47 that have operative engagement selectively with the shift gears 13—14 accordingly as the shift gears are adjustably positioned. The countershaft 45 has splines 48 made therein and has mounted thereon an axially slidable sleeve 49 engaged with said splines. Said slidable sleeve has secured thereon a gear 50 engageable in one position with the propeller shaft gear 18 accordingly as adjusted. Upon said sleeve 49 is secured another gear 51 that has toothed relation with an intermediate gear 52 which is supported upon an adjustably movable frame 53 in the gear case. The countershaft 45 and the gears 50 and 51 rotate together, and are axially movable with respect to the countershaft together with the movable frame 53, so that upon adjustment of the sleeve 49 the gear 50 and the intermediate gear 52 are selectively moved into and out of engagement with the propeller shaft gear 18. This operation is to effect reverse movement of the propeller shaft accordingly as said frame is shifted from one position to another. An adjusting member 54 consisting of a fork 55 is disposed astride of the sleeve 49 in the groove 56 made therein, and has a contiguous rack bar 57 mounted in a guide 58 in the gear case by which axial adjustable movement is imparted to said sleeve. The rack bar has engagement with a pinion 59 secured upon an operating shaft 60 that is manually oscillated through the medium of suitable mechanism, such as shown in Figs. 7 and 8, which is provided with a handle 61 conveniently located within the operator's reach as in the cab 62. The mechanism for actuating the shaft 60 is such as is ordinarily employed for imparting adjusting movement to reverse gear mechanism, the structure shown being exemplary.

In operation, the clutch is normally held in active position by springs (not shown) that press the drag plate in the usual manner against the friction discs, so that rotation of the fly wheel causes the transmission shaft to revolve. By applying pressure upon the pedal the clutch is thrown out of action whereupon the transmission mechanism idles as in the usual practice.

As the propeller shaft 9 rotates, the governor mechanism including the gear 18, spider and the collar 17 revolve accordingly with incidental tendency to axially move the shift sleeve 13 and step gears thereon rearwardly with force accelerating as the speed of the propeller shaft increases. This tendency is to an extent restrained by frictional resistance due to the engaging step gears on the transmission and countershafts and the engagement of the rock-lever 36 with the cams 35, whereupon potential force develops by centrifugal action of the governor weights which becomes effective when the foot pedal is depressed which releases pressure of the rock-lever against the cams 35. Thus, the shift sleeve 13 is automatically moved to the next succeeding position of adjustment, such as from low-gear into intermediate gear, or from intermediate gear into high gear position. In similar fashion the shift-sleeve 13 is automatically moved from high gear through intermediate gear into low gear adjustment by reactionary force of the governor springs 23 as the speed of the propeller shaft 9 decreases upon manipulation of the foot pedal 31.

Normally, the propeller shaft gear 18 and countershaft gear 50 have engagement with each other so movement is imported through the step gears and countershaft to the propeller shaft when either of the shift gears 14—15 are engaged, and when the shift sleeve 13 is in high gear position the countershaft idles.

By manipulating the handle 61 the adjusting sleeve 49 is selectively moved forwardly to disengage the drive gears 50 and 18 whereupon the countershaft idles in neutral position, or upon further moving the sleeve 49 forwardly the reverse gears 51—52 are brought into operative relation with the propeller shaft gear 18.

By the provision of the compression springs 23 and the contracting spring 24 in their operative relations with the governor weights and shift sleeve, the shift gears normally are disposed in low gear and are moved into intermediate gear or high gear only at times when the speed of the propeller shaft is suited to a particular change of the gear ratio. In this manner is circumvented shifting from the lower speed positions into the next higher speed position until the propeller shaft reaches a proper velocity.

Variations from the particular construction above disclosed may be resorted to by the exercise of skill in the art without departure from the spirit or scope of the invention, and the following claims are intended to be inclusive of such variations.

What I claim is:

1. In speed change power transmitting mechanism having a motor-driven clutch, a transmission shaft and a propeller shaft alined upon a common axis, and provided with gearing disposed for adjustment selectively into low gear, intermediate gear, high gear, neutral and reverse gear positions, a lever control for said clutch, a gear shift sleeve to move said mechanism into said low gear, intermediate gear and high gear positions, a centrifugal governor rotatable by said propeller shaft provided with a connecting collar operatively engaging said shift sleeve, a contraction spring attached to said collar to urge movement thereof toward high gear position, compression springs arranged to restrain the centrifugal action of said governor, and a mechanism engaged by said sleeve and the clutch control to prevent shifting of the sleeve while the clutch is in action.

2. In speed change power transmitting mechanism having a motor-driven clutch, a transmission shaft, and a propeller shaft alined upon a common axis and provided with gearing disposed for adjustment selectively into low gear, intermediate gear, and high gear positions, a lever control for said clutch, a gear shift sleeve to move said mechanism into said low gear, intermediate gear and high gear positions, a centrifugal governor rotated by said propeller shaft provided with a connecting collar operatively engaging said sleeve, a contraction spring attached to said collar to urge movement thereof toward high gear position, compression springs arranged to restrain the centrifugal action of said governor, and a mechanism engaged by said sleeve and the clutch control to prevent shifting of the sleeve while the clutch is in action.

3. In power transmission mechanism where a transmission shaft and a propeller shaft axially alined therewith are mounted in conjunction with speed change gearing that includes a driven gear secured on the propeller shaft and a shift gear member splined on the abutting portions of said shafts, a governor consisting of a spider splined on said propeller shaft, radially movable weights supported by the spider, compression springs restraining centrifugal action of said weights, oppositely disposed groups of bifurcated arms connectedly related with the shift gear member and the propeller shaft extending astride the corresponding weights and pivoted to the far ends thereof, and a contracting spring the opposite ends of which are connectedly related respectively to the shift gear member and the propeller shaft wherefore to urge axial movement of said shift gear member in opposition to the restraint of said compression springs.

4. In power transmission mechanism where a transmission shaft and a propeller shaft axially alined are mounted in conjunction with speed change gearing that includes a driven gear on the propeller shaft and a shift gear member splined on the abutting portions of said shafts, a centrifugal governor having a spider splined on the propeller shaft, radially movable weights supported by the spider provided with pivoted arms oppositely disposed that have operative connected relation respectively with the shift gear member and said propeller shaft, compression springs to restrain centrifugal action of said weights, and a contraction spring connectedly related to said member and the propeller shaft wherefore to counterbalance restraint of said compression springs.

CLYDE D. BUCK.